(12) United States Patent
Hoppe et al.

(10) Patent No.: US 8,490,654 B2
(45) Date of Patent: Jul. 23, 2013

(54) ELECTROMAGNETIC ACTUATING UNIT

(75) Inventors: Jens Hoppe, Erlangen (DE); Andreas Roehr, Weiden (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 237 days.

(21) Appl. No.: 13/131,311

(22) PCT Filed: Oct. 19, 2009

(86) PCT No.: PCT/EP2009/063645
§ 371 (c)(1),
(2), (4) Date: Jun. 8, 2011

(87) PCT Pub. No.: WO2010/060689
PCT Pub. Date: Jun. 3, 2010

(65) Prior Publication Data
US 2011/0232788 A1   Sep. 29, 2011

(30) Foreign Application Priority Data
Nov. 26, 2008 (DE) .................. 10 2008 059 013

(51) Int. Cl.
*F16K 11/07* (2006.01)
*F01L 1/344* (2006.01)

(52) U.S. Cl.
USPC ................ 137/625.68; 137/625.25; 251/368

(58) Field of Classification Search
USPC ........... 137/625.25, 625.67, 625.68; 251/368
See application file for complete search history.

(56) References Cited

U.S. PATENT DOCUMENTS

| | | | | |
|---|---|---|---|---|
| 2,982,306 A * | 5/1961 | Fitzgibbon | ............... | 137/625.64 |
| 3,324,890 A * | 6/1967 | Whitmore et al. | ....... | 137/625.65 |
| 4,240,467 A | 12/1980 | Blatt et al. | | |
| 4,548,385 A * | 10/1985 | Barbuto | ........................ | 251/368 |
| 4,979,542 A * | 12/1990 | Mesenich | ................ | 137/625.65 |
| 5,878,782 A * | 3/1999 | Nakajima | ................ | 137/625.68 |
| 6,289,921 B1* | 9/2001 | Neuhaus et al. | ......... | 137/625.68 |
| 6,298,880 B1 | 10/2001 | Kakamu et al. | | |
| 7,959,128 B2* | 6/2011 | Hoppe et al. | ............. | 251/129.15 |
| 2005/0000577 A1 | 1/2005 | Alman et al. | | |

FOREIGN PATENT DOCUMENTS

DE  102 30966 A1  1/2004
JP  05231553 A *  9/1993

* cited by examiner

*Primary Examiner* — John Rivell
(74) *Attorney, Agent, or Firm* — Lucas & Mercanti, LLP

(57) ABSTRACT

A hydraulic directional control valve which has a valve housing and a control piston that is arranged therein in a displaceable manner. The valve housing has at least one outflow connection, at least one inflow connection and a working connection. The control piston has a main body and at least one control section. The control section controls a pressure medium flow from the inflow connection to the working connection and/or a pressure medium flow from the working connection to the outflow connection, and the control section is made separately from the main body and is fastened thereon.

6 Claims, 1 Drawing Sheet

ELECTROMAGNETIC ACTUATING UNIT

This application is a 371 of PCT/DE2009063645 filed Oct. 19, 2009, which in turn claims the priority of DE 10 2008 059 013.4 filed No. 26, 2008, the priority of both applications is hereby claimed and both applications are incorporated by reference herein.

FIELD OF THE INVENTION

The invention relates to a hydraulic directional valve with a valve housing and a control piston displaceably arranged therein. The valve housing has at least one discharge port, one supply port and one working port. The control piston has a base body and at least one control section. The control section controls the pressure medium flow from the supply port to the working port and/or a pressure medium flow from the working port to the discharge port and the control section is manufactured separately from the base body and attached thereto.

Such hydraulic directional valves, for instance proportional directional valves, are used in combustion engines for actuating hydraulic camshaft adjusters or switchable cam followers. The hydraulic directional valves consist of an electromagnetic actuator and a valve section. The valve section forms the hydraulic section of the directional valve, wherein at least one supply port, at least one working port and a tank port is formed on the valve section. By way of the electromagnetic actuator, certain ports of the valve section can be hydraulically connected to each other in a targeted manner and therefore, pressure medium flows can be controlled.

One such hydraulic valve is disclosed in DE 102 30 966 A1, for instance. The hydraulic valve has a valve section and an electromagnetic actuator.

The valve section consists of a valve housing and a control piston arranged therein axially displaceably. The valve housing is arranged in a receiving opening of a magnet yoke of the electromagnetic actuator and stationarily connected therewith. Three pressure medium ports, a supply port and two working ports, are provided on the outer lateral surface of the valve housing. Furthermore, an axial discharge port is provided. In the interior of the valve housing, a control piston is arranged axially displaceably, whereas two control sections are formed on the control piston. The outer circumferences of the control sections are adjusted to the inner circumference of the valve housing. The pressure medium ports can be selectively connected to one another or detached from one another, depending on the relative position of the control piston to the valve housing, by way of the control sections. The control sections are formed on the control pistons as annular structures. In that, the control sections partially cover the working ports formed in the valve housing as radial openings, whereby a pressure medium flow from the supply port to the working port or a pressure medium flow from the working port to the discharge port is blocked or allowed.

Such directional valves are subject to two conflicting requirements. On the one hand, the supply of the pressure medium to one of the working ports is to be markedly higher than the discharge from the other working port. This assures a high control stability of the camshaft adjuster. Operating points of the combustion engine where high temperatures and, therefore, low viscosities of the pressure medium prevail and where the combustion engine is operated in low rotational speeds are to be taken into consideration. In these operating points, the pressure medium volume conveyed from the pressure medium pump to the supply port and to the working port connected to the latter, is low. At the same time, because of low viscosity, a high discharge is occurring from the other working port to the discharge port.

Furthermore, the hydraulic valve has to fulfill the requirement of low losses of pressure. These are, especially at low temperatures in which the pressure medium has a high viscosity, not to be disregarded. These requirements are only insufficiently taken into account in the known hydraulic directional valve.

SUMMARY OF THE INVENTION

The underlying object of the invention is therefore to create a hydraulic directional valve which has, especially in low temperature, low pressure losses and that has, even at high temperatures, a high control stability.

According to the invention, the object is met in that the control section has a higher coefficient of linear thermal expansion in the displacement direction of the control piston than the base body.

The hydraulic directional valve has a valve housing and a control piston arranged and displaceable therein. The valve housing and the control piston may, for instance, he formed substantially hollow cylindrically. In this case, the control piston may be displaceable in the axial direction inside the valve housing, for example by way of an electromagnetic actuator. The valve housing has at least one discharge port, one supply port and one working port, whereas the working port and the supply port or the discharge port may be formed as a radial opening of the valve housing. The control piston has a base body and at least one control section, wherein the control section is adjusted to an inner lateral area of the valve housing. The base body may be from sheet metal, or be an injection molding part or a turned part. Materials such as, for instance, steel, light alloys like magnesium or aluminum, or synthetic materials may be used.

The control section blocks a pressure medium flow from the supply port to the working port or from the working port to the discharge port, depending on the position of the control piston relative to the valve housing, while it allows a pressure medium flow between the respective other ports. Furthermore, positions of the control piston relative to the valve housing may be provided, in which pressure medium flows to and from the working port are completely suppressed by the control section, apart from leakage. This may be accomplished in that the control section is partially covering the working port, which is formed as a radial opening.

The control section is formed separately from the base body and connected thereto. Here, the control section has, in the displacement direction of the control piston, a higher coefficient of linear thermal expansion than the base body.

Therefore, the expansion of the control section can be dimensioned such that the overlapping of the working port by the control section is minor, when the working port is blocked in the direction of a pressure medium conveying structure communicating with an supply port. Therefore, a relatively large flow cross section is present between the working port and the discharge port, by way of which pressure losses within the directional valve are minimized. With rising temperature, the axial extension of the control section is increasing, by way of which the volume flow from the working port to the discharge port is throttled and, therefore, a high control stability of the connected load, for instance a camshaft adjuster, is achieved.

Advantageously, the control section has, in the direction perpendicular to the displacement direction of the control piston, the same or at least approximately the same coefficient of linear thermal expansion as the base body. In this manner, jamming of the control piston inside the valve housing at high temperatures is avoided, or that leakage reaches intolerable high values in low temperatures.

In a development of the invention it is provided, that, in the displacement direction, the base body has a stop the control section is bearing against. Consequently, the control section is fixed in its position in one of the displacement directions, the linear expansion taking place only along the opposite direction. Here, the stop is arranged advantageously between a pressure medium conveying structure, which communicates with the supply port, and the control section. Therefore, the linear expansion of the control section affects only the connection between the working port and the discharge port.

In one specification of the invention it is proposed that the control section consists of a polyamide, for instance PA66.

BRIEF DESCRIPTION OF THE DRAWINGS

Further features of the invention result from the following description and from the drawings, in which the exemplary embodiments of the invention are illustrated in a simplified manner. In the drawings.

DETAILED DESCRIPTION OF THE INVENTION

Figure 1:
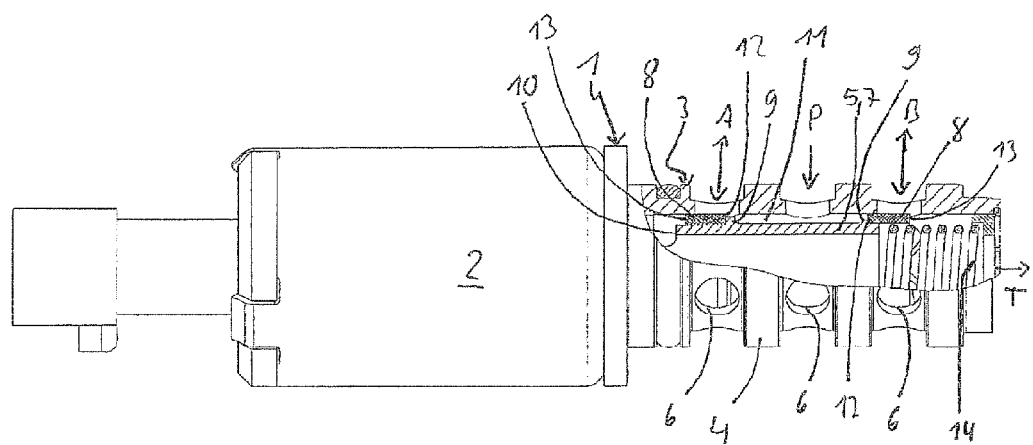
FIG. 1 shows a partial longitudinal section through a first exemplary embodiment of the hydraulic directional valve according to the invention.
Figure 2:
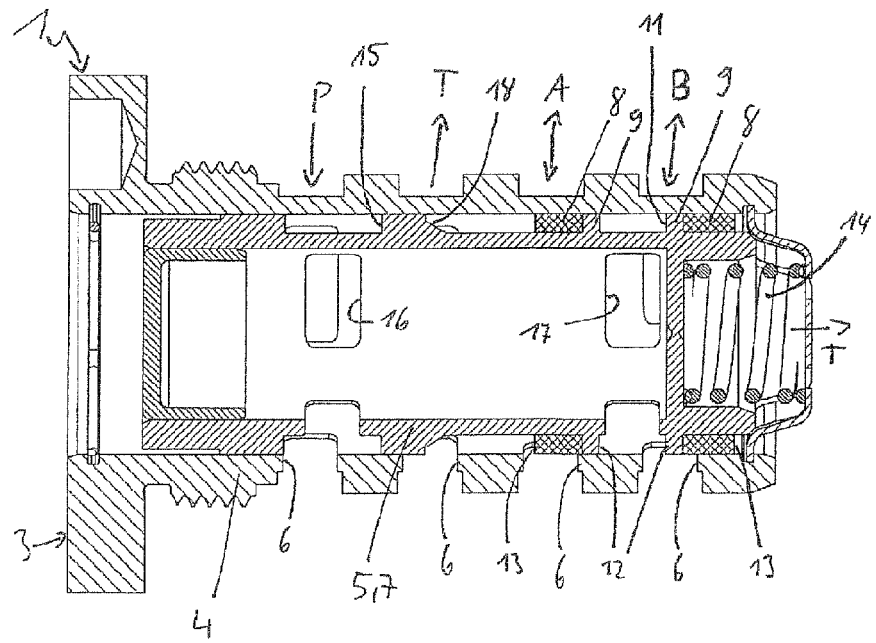
FIG. 2 shows a longitudinal section through a second exemplary embodiment of the hydraulic directional valve according to the invention.

FIGS. 1 and 2 show a first and a second exemplary embodiment of a hydraulic directional valve 1 according to the invention using the example of a directional valve 1 embodied as a ⁴⁄₃ directional proportional valve.

The directional valve 1 illustrated in FIG. 1 has an actuator 2, for instance a electromagnetic actuator 2 and a valve section 3, whereas the valve section 3 is firmly connected to the actuator 2. Such directional valves 1 are usually arranged in seats which are for instance formed in a cylinder head, a cylinder head cover, a crank case, a gear housing or the like.

The valve section 3 has a substantially hollow cylindrical valve housing 4 and a substantially hollow cylindrical control piston 5.

Several pressure medium ports A, B, P are formed on the outer lateral surface of the valve housing 4, which ports are communicating via recesses 6 with the interior of the valve housing 4. The opening of the valve housing 4 facing away from the electromagnetic actuator 2 additionally serves as discharge port T. The middle pressure medium port P, which serves as supply port, communicates via a pressure medium line (not shown) with a pressure medium pump (not shown). The two outer pressure medium ports A, B serve as working ports, which working ports communicate, for example, with a camshaft adjuster (not shown). The discharge port T communicates with a pressure medium reservoir (also not shown).

A control piston 5 is arranged axially displaceably inside the valve housing 4. This control piston consists of a base body 7 and two control sections 8 manufactured separately from the base body. The control sections 8 are arranged on an outer lateral surface of the control piston 5 and are formed as annular lands. The outer diameter of the control sections 8 is adapted to the inner diameter of the valve housing 4. In the axial direction, the control sections 8 bear against stops 9 formed on the base body 7. At the same time, the stops 9 are provided on that side of the control sections 8 which are facing the supply port P. Furthermore, openings 10 are provided on the base body 7, which openings 10 connect the exterior of the base body 7 with its interior.

By energizing the actuator 2, the control piston 5 is displaceable against the force of a spring element 14 into any desired position between two end stops and can be held there. Via a suitable axial positioning of the control piston 5 relative to the valve housing 4, adjacent pressure medium ports A, B, P can be connected to one another. The working port A, B not connected at the time to the supply port P, is connected to the tank port T at the same time. For this purpose, two control edges 12, 13 are formed on each of the control sections 8 on their axial end sides. Depending on the position of the control piston 5 in the valve housing 4, the first control edge 12 of a control section 8 blocks the connection between the supply port P and the respective working port A, B, while the second control edge 13 of the other control section 8 blocks the connection between the other working port A, B and the discharge port T.

During operation of the combustion engine, pressure medium is fed to the supply port P, which arrives via the recess 6 at a pressure medium structure, in the illustrated embodiment an annular groove 11, in the interior of the valve housing 4. Depending on the position of the control piston 5 relative to the valve housing 4, the pressure medium arrives at the first or the second working port A, B and from there via a pressure medium line to the load. At the same time, pressure medium arrives from the load to the other working port A, B and from there or via the openings 10 and the interior of the control piston 5 or directly to the discharge port T.

The control sections 8 are manufactured from a material that has a larger coefficient of linear thermal expansion in the axial direction than the base body 7. On the plane perpendicular to the direction of displacement, the control sections 8 have a coefficient of linear expansion, which is approximately that of the base body 7. Since the control sections 8 bear against the stops 9 in the axial direction, the axial positions of the first control edges 12 do not change with increasing temperature. In contrast, the axial positions of the second control edges 13 move with rising temperature because of the temperature-dependent longitudinal expansion in the direction of the axial ends of the base body 7. At low temperatures, with a given cross-sectional area between the supply port P and one of the working ports A, B, a relatively large cross-sectional area between the other working port A, B and the discharge port T is present.

With rising temperature, the cross-sectional area between the working port A, B and the discharge port T is shrinking. Therefore, even with decreasing viscosity of the pressure medium, a high control stability of the load can be maintained.

FIG. 2 shows a further embodiment of a directional valve 1 according to the invention. In this embodiment, the valve section 3 is not stationarily fixed to an actuator (not shown). Instead, the valve section 2 is arranged inside a load, for instance an inner rotor of a camshaft adjuster and the actuator 3 is positioned axially offset thereto. The actuating movement of the actuator can, for instance, be transmitted via a pushrod (not shown) to the control piston 5.

In this embodiment, pressure medium is conveyed via the supply port P to the directional valve 1. The pressure medium arrives at a second annular groove 15 formed on the control piston 5 via recesses 6 of the supply port P and via first openings 16 the interior of the control piston 5. From there, the pressure medium arrives via second openings 17 in a pressure medium conveying structure, in the illustrated embodiment an annular groove 11. Depending on the position of the control piston 5 relative to the valve housing 4, the pressure medium arrives from there to the first or second working port A, B and from there to the hydraulic load. At the same time, pressure medium is conveyed from the load to the other working port A, B and from there either directly to an axial discharge port T or via a third annular groove 18 to a radial discharge port T.

In contrast to the first embodiment, the outer diameter of the stops 9 is adjusted to the inner diameter of the valve housing 4. Therefore, the first control edges 12 are formed on the stops 9 and the second control edges 13 are formed on the control sections 8. As in the first embodiment, the axial position of the first control edges 12 relative to the base body 7 remains constant with the temperature, while the axial distance of the second control edges 13 from the respective first control edge 12 increases with rising temperature.

REFERENCE SIGNS

1 Directional Valve
2 Actuator
3 Valve Section
4 Valve Housing
5 Control Piston
6 Recesses
7 Base Body
8 Control Section
9 Stop
10 Opening
11 Annular Groove
12 First Control Edge
13 Second Control Edge
14 Spring Element
15 Second Annular Groove
16 First Opening
17 Second Opening
18 Third Annular Groove
P Supply Port
T Tank Port
A First Working Port
B Second Working Port

The invention claimed is:

1. A hydraulic directional valve, comprising:
   a valve housing having at least one discharge port, at least one supply port and at least one working port; and
   a control piston, which is arranged displaceably within the valve housing, having a base body and at least one control section connected to the base body,
   the control section, which is manufactured separately from the base body, controlling a pressure medium flow from the supply port to the working port and/or a pressure medium flow from the working port to the discharge port and the control section, in a displacement direction of the control piston, having a larger coefficient of linear thermal expansion than the base body.

2. The hydraulic directional valve according to claim 1, wherein the control section has, perpendicular to the displacement direction of the control piston, a same or at least approximately same coefficient of linear thermal expansion as the base body.

3. The hydraulic directional valve according to claim 1, wherein the base body has a stop and the control section bears against the stop in the displacement direction of the control piston.

4. The hydraulic directional valve according to claim 3, further comprising a pressure medium conveying structure communicating with the supply port and the control section, with the stop being arranged between the pressure medium conveying structure.

5. The hydraulic directional valve according to claim 1, wherein the control section comprises a polyamide.

6. The hydraulic directional valve according to claim 5, wherein the polyamide is PA66.

* * * * *

UNITED STATES PATENT AND TRADEMARK OFFICE
CERTIFICATE OF CORRECTION

PATENT NO.       : 8,490,654 B2                                                      Page 1 of 1
APPLICATION NO.  : 13/131311
DATED            : July 23, 2013
INVENTOR(S)      : Hoppe et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 250 days.

Signed and Sealed this
Eighth Day of September, 2015

Michelle K. Lee
*Director of the United States Patent and Trademark Office*